(12) United States Patent
Nothofer et al.

(10) Patent No.: US 7,522,795 B2
(45) Date of Patent: Apr. 21, 2009

(54) LOOSE TUBE OPTICAL WAVEGUIDE FIBER CABLE

(75) Inventors: Klaus Nothofer, Erkrath (DE); Peter Lausch, Krefeld (DE)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/848,504

(22) Filed: Aug. 31, 2007

(65) Prior Publication Data
US 2008/0056651 A1  Mar. 6, 2008

(30) Foreign Application Priority Data
Aug. 31, 2006 (WO) ............... PCT/NL2006/000440

(51) Int. Cl.
G02B 6/44 (2006.01)
(52) U.S. Cl. ...................... 385/109; 385/100
(58) Field of Classification Search ................ 385/109
See application file for complete search history.

(56) References Cited

U.S. PATENT DOCUMENTS

| | | | |
|---|---|---|---|
| 4,664,472 A * | 5/1987 | Mayr et al. | 385/109 |
| 4,828,352 A * | 5/1989 | Kraft | 385/109 |
| 5,267,932 A | 12/1993 | Grant | |
| 6,091,871 A | 7/2000 | Elisson et al. | |
| 6,167,178 A * | 12/2000 | Nave | 385/103 |
| 2004/0151906 A1 | 8/2004 | Pinto | |
| 2008/0056651 A1 | 3/2008 | Nothofer et al. | |

FOREIGN PATENT DOCUMENTS

| | | |
|---|---|---|
| EP | 1895339 A1 | 3/2008 |
| GB | 1529001 | 10/1978 |
| WO | 01/151554 A1 | 7/2001 |
| WO | 2008026912 A1 | 3/2008 |

OTHER PUBLICATIONS

SEDI Fibres Optiques Product Catalog, Feb. 2002, France.
Corning Cable Systems, "Altos LSZH Gel-Free Interlocking Armored Cables," [Online] Mar. 2006, USA, Retrieved from the Internet: URL:http://www.corningcablesystems.com/web/library/lltindex.nsf/$all/LAN-491-EN/$file/LAN-491-EN.pdf>.
International Search Report for corresponding PCT application PCT/NL2006/000440, mailed Mar. 9, 2007.
Extended European Search Report in corresponding European Application Serial No. 07016905, dated Nov. 26, 2007.
Corning Cable Systems, "ALTOS LSZH Gel-Free Interlocking Armored Cables," [Online] Mar. 2006, USA, Retrieved from the Internet: URL:http://www.corningcablesystems.com/web/library/lltindex.nsf/$all/LAN-491-EN/&file/LAN-491-EN.pdf>.
EPO Communication in corresponding European Application Serial No. 07016905, dated Jul. 31, 2008.

* cited by examiner

*Primary Examiner*—Uyen Chau N Le
*Assistant Examiner*—Kajli Prince
(74) *Attorney, Agent, or Firm*—Summa, Additon & Ashe, P.A.

(57) ABSTRACT

The present invention relates to loose tube optical waveguide fiber cable which is optimized for easy and fast installation as plenum cable, such as in customer premises for FTTH (fiber to the home) applications. One of the objects of the present invention is to provide a loose tube optical waveguide fiber cable which is suitable for fixed in-house cabling at extremely low-cost for a large-scale installation of FTTH.

19 Claims, 1 Drawing Sheet

LOOSE TUBE OPTICAL WAVEGUIDE FIBER CABLE

CROSS-REFERENCE TO PRIORITY APPLICATION

This application hereby claims the benefit of pending International Application No. PCT/NL2006/000440 (filed Aug. 31, 2006, at the Dutch Patent Office) via 35 U.S.C. §365(a). International Application No. PCT/NL2006/00040 is hereby incorporated by reference in its entirety.

FIELD OF THE INVENTION

The present invention relates to a loose tube optical waveguide fiber cable that is optimized for easy and fast installation as plenum cable, such as in customer premises for FTTH (fiber to the home) applications.

BACKGROUND OF THE INVENTION

Optical waveguide fibers are normally provided with a plastic protective coating applied by the fiber manufacturer directly over the cladding in order to protect the fiber.

In tight buffered cables, a protective tube is applied by the cable manufacturer directly to the outer surface of the protective fiber coating so that the fiber and the tube are in contact substantially along their length. Such an optical fiber cable is known from U.S. Pat. No. 5,627,932.

In loose tube or composite buffer constructions, the coated optical fiber is separated from the protective tube. Such a cable is known from U.S. Pat. No. 6,091,871. This patent discloses a reinforced optical fiber cable that includes a protective tube for protecting optical fibers, a reinforcing layer, and reinforcing rods around the protective tube, together with an outer sheath. Such a cable has relatively stiff rods that are embedded in the sheath, parallel to the axis of the cable. These rods may be made of reinforced plastic material or steel. In addition, the inside space in which the optical waveguides are received contains a filler material to protect the optical waveguides against penetration of moisture.

The SEDI FIBRES OPTIQUES PRODUCT CATALOG, February (2002 2002-02, France) discloses a loose tube optical waveguide fiber assembly, but it is made of material that is not flame retardant.

The U.S. website for CORNING CABLE SYSTEMS shows its "ALTOS LSZH Gel-Free Interlocking Armored Cables" as originally disclosed in March 2006. (On Feb. 21, 2007, this document was available on the Internet at URL http://www.corningcablesystems.com/web/library/lltindex-.nsf/$all/LAN-491-EN/$file/LAN-491-EN.pdf>). The Corning website discloses a loose tube optical waveguide fiber assembly made of a material that is not flame retardant, although the tubes are arranged inside an outer flame-retardant sheath. The space between the optical waveguide fibers and the tube is filled with swellable materials.

Publication No. GB 1,529,001 relates to an optical conductor for use in an optical cable having a glass fiber and a protective sheath surrounding the glass fiber. The protective sheath is composed of two layers of different synthetic resin materials (i.e., an inner layer consisting of polystyrene or a fluorinated polymer, and an outer layer consisting of a polyamide, a polyterephthalate, a polypropylene, or polyethylene).

U.S. Pat. No. 6,167,178 relates to a fiber optic cable including at least one optical fiber having a buffer layer formed of a flame-retardant polyolefin material that is tightly formed about the optical fiber, thereby defining a tight buffer layer, a layer of strength members, and a cable jacket surrounding optical fiber in contact with at least some strength members.

Such tight buffered cables, however, are expensive and accessing the fibers is time-consuming. Central-filled loose tubes are expensive, too, and require fiber cleaning. In addition, these gel-filled central loose tubes have high minimum cable bend radii due to kinking of the loose tube.

SUMMARY OF THE INVENTION

One of the objects of the present invention is to provide a loose tube optical waveguide fiber cable that is suitable for fixed in-house cabling and is extremely cost-effective for a large-scale installation of FTTH.

Another object of the present invention is to provide a loose tube optical waveguide fiber cable that has a reduced fiber access time compared with other cable designs (e.g., tight buffered designs).

These and other objects are provided, according to the present invention, by a loose tube optical waveguide fiber cable having (i) two or more optical waveguides, and (ii) a protective tube loosely surrounding the two or more optical waveguides, wherein the protective tube has an inner diameter and an outer diameter, and the cable contains no gel-like compounds and no strengthening elements.

The foregoing, as well as other objectives and advantages of the invention, and the manner in which the same are accomplished, are further specified within the following detailed description and its accompanying drawing.

DETAILED DESCRIPTION

Figure 1:
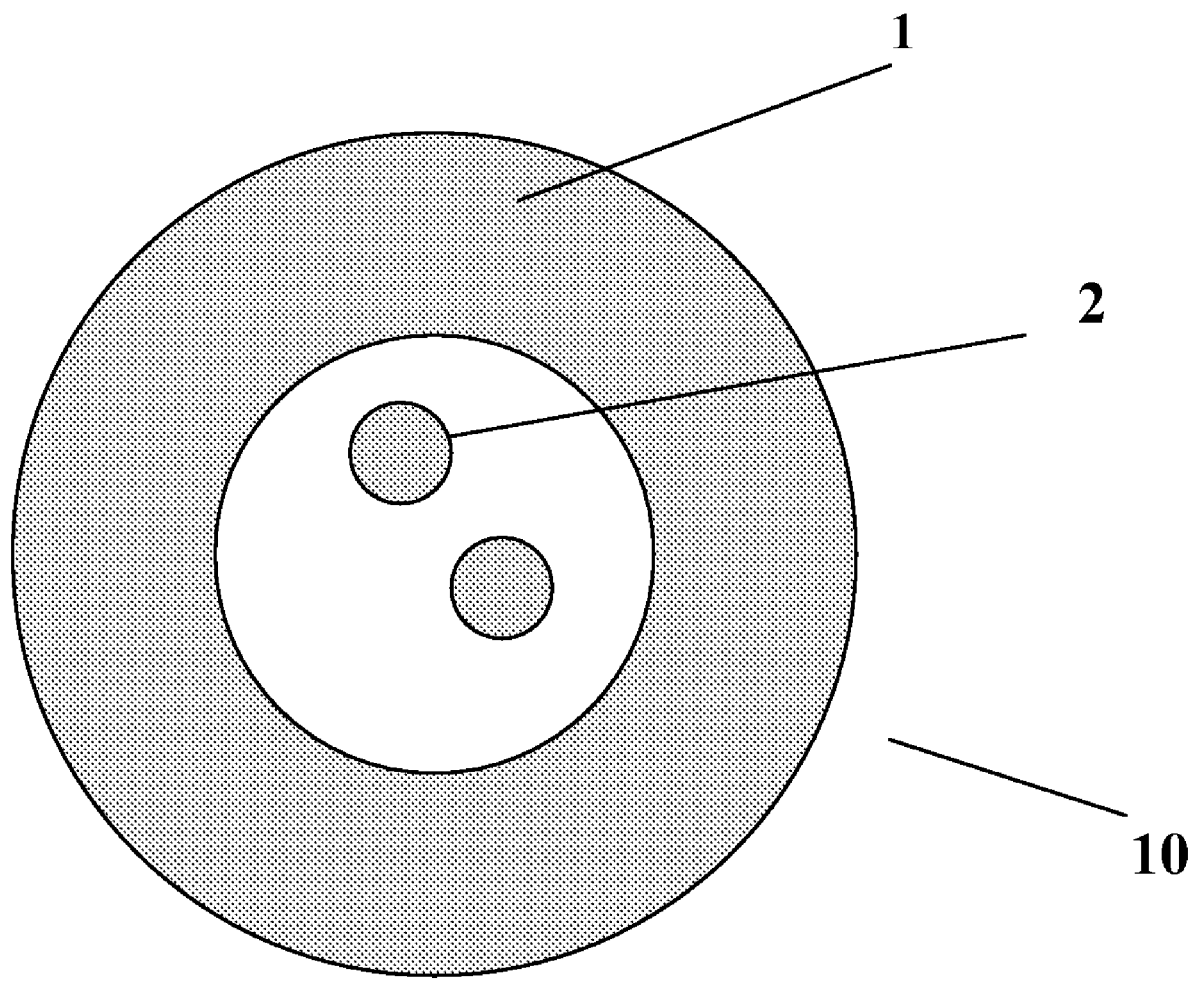
FIG. 1 schematically depicts a cross-sectional view of a loose tube cable according to the present invention.

A loose tube optical waveguide fiber cable 10 according to the present invention may be constructed as schematically depicted in FIG. 1. The cable 10 contains two optical fibers 2 surrounded by a coating (not shown) that is applied directly over the optical fiber 2. The optical fiber 2 may contain a core and a cladding surrounding the core, with one or more polymer coatings applied over the cladding. The protective tube 1 (or outer jacket), which is formed of flame-retardant material, loosely surrounds the optical fibers 2. In other words, the optical fibers 2 are loosely provided within the protective tube 1. The number of optical fibers 2 is not restricted to a specific number.

The cable 10 contains neither gel-like compounds nor any strengthening members. Accordingly, protective tube 1 is a hollow structure of uniform composition and has open space between the optical fibers 2 and the inner wall of the tube 1. Cable 10 is suitable for riser or plenum applications.

The cable 10 according to the present invention typically comprises a minimum static bend radius of 25 millimeters with standard single mode fibers and a minimum static bend radius of 10 millimeters with low-bend loss fibers.

In a typical embodiment of the present invention, the wall thickness of the protective tube 1 is in a range of 0.3 to 0.45 times the outer diameter of the tube. The material of the protective tube 1 is typically a halogen-free, flame-retardant polymer. A suitable material of the protective tube 1 is a flame-retardant material with a high degree of inorganic fillers. The flame-retardant material typically has a density of greater than 1.35 g/cm$^3$.

According to one embodiment, the inner diameter of the protective tube 1 of the loose tube optical waveguide fiber cable 10 is at least 0.5 millimeter greater than the diameter of the closest theoretical circle that would fit around all of the two or more optical waveguides 2.

The present invention provides a cable with two or more optical waveguides 2 surrounded by a single protective tube 1, also referred to as a "polymer jacket" or a "sheath," wherein no filling gels or swellable materials, and no strengthening elements, like rods or yarns, are used. Such a cable is to be regarded as a totally dry structure. The term "single" means a protective tube 1 made of one material (i.e., a single layer protective tube 1). The protective tube 1 according to the present invention contains no elements besides the optical waveguides 2.

Fiber access is easy due to the use of halogen-free, fire-retardant sheathing material made of thermoplastics and a high fraction of inorganic fillers. This material breaks easily when an initial cut is made.

A simple way to access the optical fibers 2 is to perform a circular cut with a conventional knife without cutting through completely, breaking the protective sheath by repeated bending, and then pulling away the protective sheath 1 over the optical fibers 2. Because of the absence of any filling compound in the tube 1 this can be done in one operation over the desired length.

Another possibility is to use a conventional cable stripper, adjusted not to cut through the inner surface of the sheath 1. The next steps are to break the sheath 1 by repeated bending and then pulling away the sheath 1 over the optical fibers 2. Again, because of the absence of any filling compound in the tube 1 this can be done in one operation over the desired length.

The method for manufacturing the loose tube optical waveguide fiber cable 10 is similar to buffer tube extrusion at standard secondary coating lines. For maintaining certain values of excess fiber length, the fiber payoff is equipped with a tension control device. Typical values are around 0.5 to 2 N. The fiber passes the extruder crosshead. The extruder is typically equipped with a specially designed screw, a breaker, a crosshead and tooling for working with the flame-retardant material. A pull-off capstan or similar device is located adjacent to the first cooling section.

The cable 10 is turned with at least one turn—typically two to four turns—around a required capstan. This capstan is necessary because the lack of filling compound causes the capstan to couple the fibers 2 to the tube 1. Also, the distance between crosshead and capstan affects the excess fiber length. The excess fiber length is further affected by (i) cooling conditions, (ii) the tension controlled between the capstan and the downstream pulling device, and (iii) the tension between the pulling device and the take-up device.

Examples of the materials that can be used for the protective tube are DRAKA DHF9822, DRAKA DHF9761 and Scapa MELGOLON S 550.

The above noted materials are generally composed of polymers or copolymers of polyolefins. Other plastic materials such as EVA, polyamides or polyphenylene ester might be suitable and can be filled with mineral fillers (e.g., aluminium hydroxide or magnesium hydroxide) to give the desired level of flame retardance. Typically, cables according to this invention contain additional components, such as UV stabilizers, antioxidants, color pigments, and processing additives.

In the specification and the figure, typical embodiments of the invention have been disclosed. The present invention is not limited to such exemplary embodiments. Specific terms have been used only in a generic and descriptive sense, and not for purposes of limitation. The scope of the invention is set forth in the following claims.

The invention claimed is:

1. A loose tube optical waveguide fiber cable, comprising:
    two or more optical waveguides; and
    a protective tube loosely surrounding said two or more optical waveguides, said protective tube having an inner diameter and an outer diameter, said cable containing no gel-like compounds and no strengthening elements;
    wherein the wall thickness of said protective tube is in a range of 0.3 to 0.45 times the outer diameter of said protective tube.

2. A loose tube optical waveguide fiber cable according to claim 1, wherein said protective tube is a single layer protective tube.

3. A loose tube optical waveguide fiber cable according to claim 1, wherein said protective tube comprises polyolefin polymers or copolymers.

4. A loose tube optical waveguide fiber cable according to claim 1, wherein said protective tube comprises EVA, polyamides or polyphenylene ester.

5. A loose tube optical waveguide fiber cable according to claim 1, wherein:
    said two or more optical waveguides comprise standard single mode fibers; and
    said cable possesses a minimum static bend radius of 25 millimeters.

6. A loose tube optical waveguide fiber cable according to claim 1, wherein:
    said two or more optical waveguides comprise low-bend loss fibers; and
    said cable possesses a minimum static bend radius of 10 millimeters.

7. A loose tube optical waveguide fiber cable according to claim 1, wherein the inner diameter of said protective tube is at least 0.5 millimeter greater than the diameter of the closest circle around said two or more optical waveguides.

8. A loose tube optical waveguide fiber cable, comprising:
    two or more optical waveguides; and
    a protective tube loosely surrounding said two or more optical waveguides, said protective tube having an inner diameter and an outer diameter, said cable containing no gel-like compounds and no strengthening elements;
    wherein the material of said protective tube is a halogen-free, flame-retardant polymer;
    wherein the density of the material of said protective tube is a least 1.35 g/cm$^3$; and
    wherein the inner diameter of said protective tube is at least 0.5 millimeter greater than the diameter of the closest circle around said two or more optical waveguide.

9. A loose tube optical waveguide fiber cable according to claim 8, wherein said protective tube is a single layer protective tube.

10. A loose tube optical waveguide fiber cable according to claim 8, wherein said protective tube comprises polyolefin polymers or copolymers.

11. A loose tube optical waveguide fiber cable according to claim 8, wherein said protective tube comprises EVA, polyamides or polyphenylene ester.

12. A loose tube optical waveguide fiber cable according to claim 8, wherein:
    said two or more optical waveguides comprise standard single mode fibers; and
    said cable possesses a minimum static bend radius of 25 millimeters.

13. A loose tube optical waveguide fiber cable according to claim 8, wherein:
   said two or more optical waveguides comprise low-bend loss fibers; and
   said cable possesses a minimum static bend radius of 10 millimeters.

14. A loose tube optical waveguide fiber cable, comprising:
   two or more optical waveguides; and
   a protective tube loosely surrounding said two or more optical waveguides, said protective tube having an inner diameter and an outer diameter, said cable containing no gel-like compounds and no strengthening elements;
   wherein the inner diameter of said protective tube is at least 0.5 millimeter greater than the diameter of the closest circle around said two or more optical waveguides.

15. A loose tube optical waveguide fiber cable according to claim 14, wherein said protective tube is a single layer protective tube.

16. A loose tube optical waveguide fiber cable according to claim 14, wherein said protective tube comprises polyolefin polymers or copolymers.

17. A loose tube optical waveguide fiber cable according to claim 14, wherein said protective tube comprises EVA, polyamides or polyphenylene ester.

18. A loose tube optical waveguide fiber cable according to claim 14, wherein:
   said two or more optical waveguides comprise standard single mode fibers; and
   said cable possesses a minimum static bend radius of 25 millimeters.

19. A loose tube optical waveguide fiber cable according to claim 14, wherein:
   said two or more optical waveguides comprise low-bend loss fibers; and
   said cable possesses a minimum static bend radius of 10 millimeters.

* * * * *

UNITED STATES PATENT AND TRADEMARK OFFICE
CERTIFICATE OF CORRECTION

PATENT NO.        : 7,522,795 B2                                     Page 1 of 1
APPLICATION NO.   : 11/848504
DATED             : April 21, 2009
INVENTOR(S)       : Klaus Nothofer and Peter Lausch It is certified that error appears in the above-identified patent and that said Letters Patent is hereby corrected as shown below:

In the Claims

Claim 8, column 4, line 52 reads "circle around said two or more optical ~~waveguide.~~" and should read "circle around said two or more optical waveguides."

Signed and Sealed this

Twenty-ninth Day of December, 2009

David J. Kappos
*Director of the United States Patent and Trademark Office*